United States Patent [19]

Taft

[11] Patent Number: 5,223,675
[45] Date of Patent: Jun. 29, 1993

[54] CABLE FASTENER

[76] Inventor: Anthony W. Taft, 710 Dream Isle, Belding, Mich. 48809

[21] Appl. No.: 861,946

[22] Filed: Apr. 2, 1992

[51] Int. Cl.⁵ .................... H01B 17/00; F16B 15/00
[52] U.S. Cl. .................... 174/159; 174/164; 174/165; 411/450; 411/456; 411/920
[58] Field of Search ............ 174/164, 159, 165; 248/71, 216.1; 182/90; 411/451, 456, 457, 471, 472, 487, 490, 492, 493, 499, 920, 446, 447, 448, 449, 450; D8/390, 393

[56] References Cited

U.S. PATENT DOCUMENTS

| 29,472 | 10/1898 | Hughes | 411/473 |
|---|---|---|---|
| 271,825 | 2/1883 | Fiske . | |
| 274,481 | 3/1883 | Frost | 411/920 |
| 342,471 | 5/1886 | Smith | 411/475 |
| 446,523 | 2/1891 | Jester | 411/920 |
| 573,101 | 12/1896 | O'Neill . | |
| 1,705,144 | 3/1929 | Tobey . | |
| 1,741,279 | 12/1929 | Bowman | 411/471 |
| 1,841,353 | 1/1932 | Boggess | 411/475 |
| 2,294,463 | 9/1942 | Krantz | 1/46 |
| 2,526,902 | 10/1950 | Rublee | 174/159 |
| 3,076,373 | 2/1963 | Matthews | 85/23 |
| 3,085,129 | 4/1963 | Anderson | 174/159 |
| 3,176,945 | 4/1965 | Anderson | 174/159 |
| 3,339,448 | 9/1967 | McKee | 411/920 X |
| 3,341,651 | 9/1967 | Odegaard | 174/159 |
| 3,430,903 | 3/1969 | Mathes | 248/68 |
| 3,787,608 | 1/1974 | Colby et al. | 174/159 |
| 3,848,080 | 11/1974 | Schmidt | 174/164 |
| 3,894,174 | 7/1975 | Cartun | 174/159 |
| 4,014,244 | 3/1977 | Larson | 411/475 |
| 4,588,152 | 5/1986 | Ruehl et al. | 248/71 |
| 4,697,045 | 9/1987 | Beatty | 174/159 |
| 4,994,073 | 2/1991 | Green | 411/457 X |

FOREIGN PATENT DOCUMENTS

| 930002 | 7/1955 | Fed. Rep. of Germany . |
| 221061 | 11/1942 | Switzerland . |
| 301713 | 12/1928 | United Kingdom . |

Primary Examiner—Leo P. Picard
Assistant Examiner—Hyung S. Sough
Attorney, Agent, or Firm—Price, Heneveld, Cooper, DeWitt & Litton

[57] ABSTRACT

An integral cable fastener having two parallel legs joined on one end by an integral cross member or bridge to form a curved cable engagement surface, the free ends of the legs having end barbs formed by sloping surfaces, and having transverse withdrawal resisting shoulders. Ribs on the concave inner surface of the bridge secure the cable against linear or lateral movement. Transverse drive surfaces on the bridge are axially aligned with the legs and barbs. Insertion depth control shoulders on the legs limit depth of insertion to a predetermined value.

6 Claims, 2 Drawing Sheets

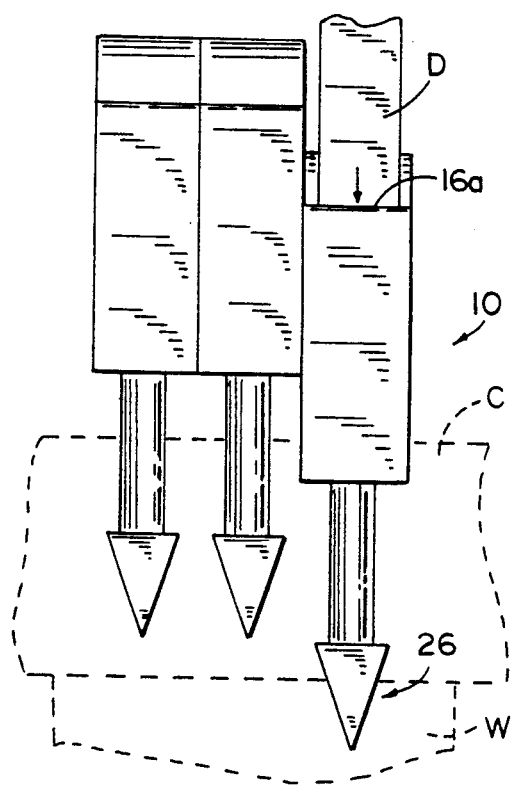
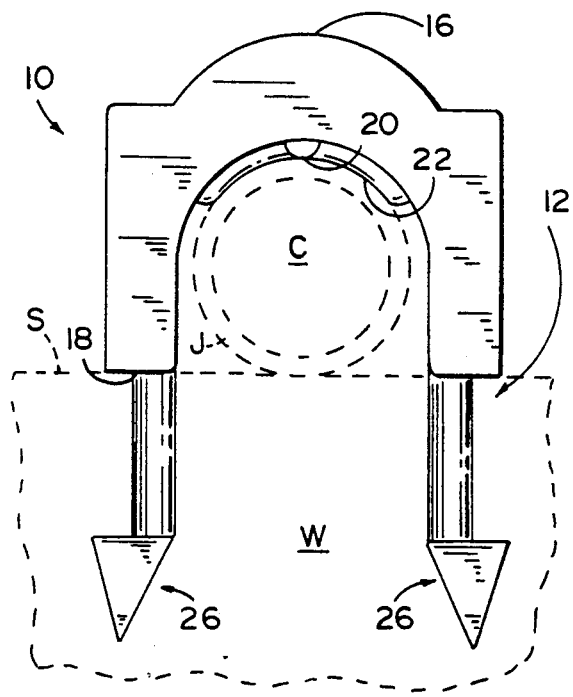
FIG. 6    FIG. 7
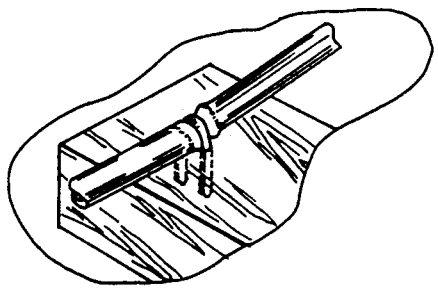
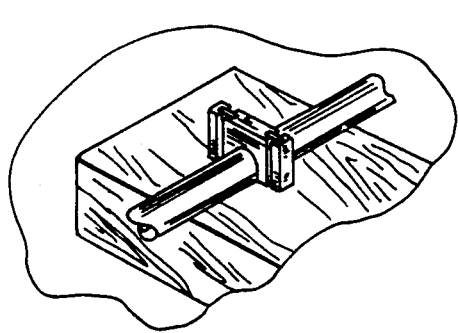
FIG. 8   PRIOR ART    FIG. 9   PRIOR ART

CABLE FASTENER

BACKGROUND OF THE INVENTION

This invention relates to a fastener for securing electrically conductive (including signal conductive), insulation coated cables such as television signal conducting cables, to support members, usually of wood.

Attachment of television cables and the like to support members of a building such as a home is primarily accomplished at the present time by using U-shaped wire staples fired from a staple gun. The wire staple and gun are simple, inexpensive and easily employed by cable installers. Unfortunately, however, such staples typically distort the cable (see FIG. 8 herein) and often even short out the cable by puncturing the insulation jacket. After installation it is extremely difficult to determine which staple or staples of the many used have caused the shorting action. Further, such wire staples themselves become distorted as they are inserted, especially if one leg engages a more dense material than the other. Moreover, such staples, after installation, have a tendency to undesirably pull back out of the wood support. Often the staples do not hold the cable securely such that the cable can move linearly and thereby scrape the insulation, or twist within the staple. Both of these are undesirable characteristics.

Because of these problems with the wire staple, another type of fastener has been developed heretofore (FIG. 9). It is formed of multiple pieces including a rectangular, molded, plastic body with two loosely inserted tiny wire nails extending through preformed openings at opposite ends of the body. This complex and relatively more expensive fastener is installed by a special installation tool. This type of fastener has a high rate of waste due to difficulty in hitting and driving the small nails, due to faulty cartridge characteristics holding the fasteners together in battery form, and other factors. The fastener is also considered to be bulky and to have poor appearance. Moreover, the small fastener nails often do not penetrate in a manner to restrain the cable against movement axially or against cable twisting, so that the cable insulation can be punctured as it slides through the fastener. And the tiny nails have a tendency to pull back out of the wood after installation. Consequently, in spite of this elaborate fastener being available, the cheap wire staple is really the industry standard, despite its defects.

The inventor herein, a television cable installer by trade, has experienced the frustration of making potentially defective installations using wire staples which are standard to the industry. He realized from his own experience and from communication with others in the trade that there is a significant need for a fastener that would be simple, relatively inexpensive, one piece in structure, capable of installation from a common staple gun, consistent in its penetration characteristics, stable against retraction, usable in a battery type arrangement, not having the cable distortion and shorting potential which characterize the present technology, and being rust or corrosion resistant.

SUMMARY OF THE INVENTION

Therefore, the present invention was conceived and developed to fill this definite need in the industry, culminating in a relatively simple yet specialized, basically one-piece rigid fastener of corrosion resistant zinc alloy, stainless steel or other noncorroding alloy, capable of installation from a battery format of fasteners, to a controlled depth, secure against retraction, without distortion and/or shorting of the conductive cable or other electrical conductor, and securing the cable against twisting and linear movement therethrough. A controlled engagement is made with the cable during insertion and thereafter such that the cable insulation is not penetrated and the cable does not suffer increased impedance. The fastener has proven in tests to retain the cable securely against movement and not accidentally pull out of the wood or other material into which it is embedded. Controlled experiments with the fastener show it to be highly effective and impressive in its characteristics, excellent for securing coaxial cable.

The fastener has a pair of parallel legs integrally joined at one end by a cross member or bridge, the integral structure forming a smooth interior cable engagement surface. The free ends of the legs are pointed, forming barbs, being formed of sloped inside, outside and end surfaces of a configuration and relationship causing slight outward lateral movement of the legs during forced insertion, for optimum gripping in the wood or other material. At the juncture of the parallel legs and the sloped surfaces are offset locking shoulders which are transverse to the parallel legs to resist removal of the fastener from the support member. The legs have depth controlling stop shoulders above the offset locking shoulders to limit penetration to a preselected depth. The depth controlling shoulders are transverse to the axes of the legs. The outer portions of these shoulders enable a series of the fasteners to ride on tracks of a conventional driver. The inner cable engaging surface has insulation deflecting ribs preventing axial cable movement or cable shifting.

These and other objects, advantages and features of the novel device will become apparent upon studying the following specification in conjunction with the drawings.

BRIEF DESCRIPTION OF THE DRAWINGS

FIG. 6 is a perspective view of a battery of the novel fasteners, with one shown being forcibly ejected from the battery and inserted around a cable;

FIG. 7 is an elevational view showing attachment of a cable (in phantom) to a support surface (in phantom) by the fastener;

FIG. 8 is a perspective view of a prior art wire staple shown securing a cable to a support surface; and FIG. 9 is a perspective view of another prior art fastener.

DESCRIPTION OF THE PREFERRED EMBODIMENT

Figure 1:
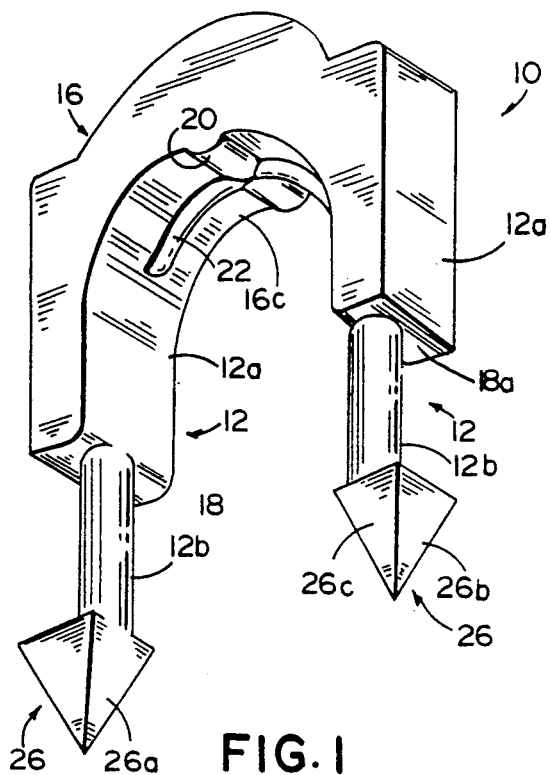
FIG. 1 is a perspective view of the novel fastener.
Figure 2:
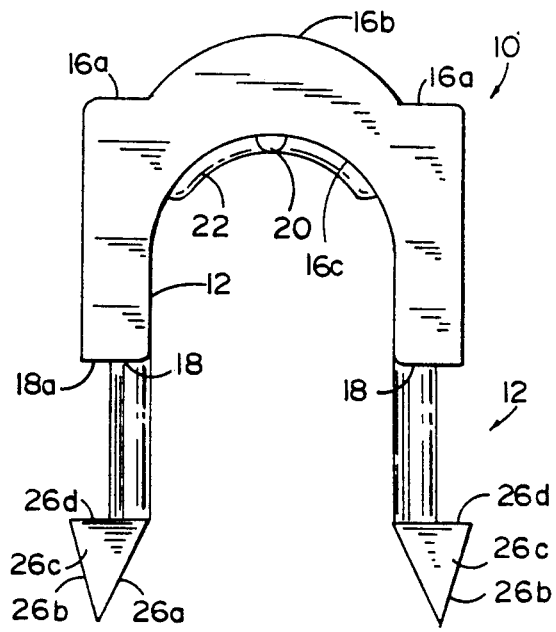
FIG. 2 is a front elevational view of the novel fastener (the rear elevational view is identical)
Figure 4:
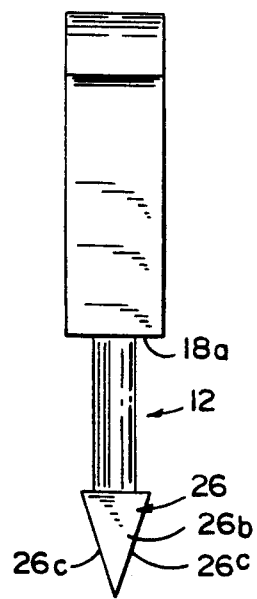
FIG. 4 is a side elevational view of the fastener (the opposite side view is identical)
Figure 3:
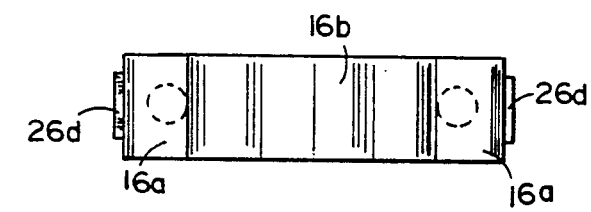
FIG. 3 is a top plan view of the fastener.
Figure 5:
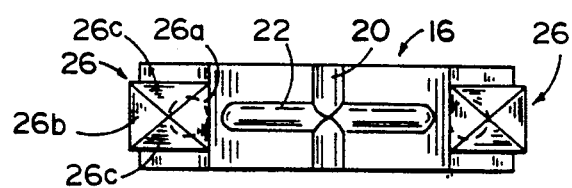
FIG. 5 is a bottom view of the fastener.

Referring now specifically to the drawings, the novel fastener 10 is depicted in FIGS. 1-5 in single form, in FIG. 6 in battery form, and in FIG. 7 as installed. It has a generally U-shaped body including a pair of legs 12 integrally interconnected at one end of the legs by a cross member or bridge 16, and parallel to each other. The ends of the fastener are also parallel to each other.

This cross member forms an anvil of a pair of spaced, upper, coplanar, horizontal, generally flat surfaces 16a astraddle convex, upwardly extending protrusion 16b for engagement of these surfaces by a driver for installation. Surfaces 16a are in axial alignment with legs 12, and perpendicular to the axis of the legs The lower portion 12b of each of legs 12, i.e., that portion forming the barbs, has a generally circular cross sectional configuration. The upper portions 12a of legs 12 are greater in breadth, i.e., from front to back, than the diameter of lower portion 12a, and are shown to have a rectangular cross section. Specifically, the upper portion 12a of each leg is of generally rectangular cross sectional configuration, having an inner surface which is aligned with the inner surface of lower portion 12b, and having an outer surface which is beyond the outer surface of lower portion 12b, to form a pair of faces 18a oriented toward barbs 26. Upper portions 12a also have a greater breadth than the breadth of lower portions 12b, to form downwardly facing, depth control stop shoulders 18 on each lower leg. Each shoulder 18 is formed of two parts astraddle leg portion 12b, transverse to the leg axis. Faces 18a thus form part of shoulder 18. The inner edges of the shoulders are rounded to eliminate sharp edges which could penetrate the cable jacket The outwardly extending faces 18a enable the fastener to rest upon and slide along the tracks of a conventional driver tool. Therefore, a battery of these fasteners can be inserted into a conventional driver tool in known fashion, to be driven individually by the driver hammer around the cable into the support.

At the juncture of the barbs with legs 12 are locking shoulders 26d. These are generally flat, oriented upwardly toward bridge 16, being transverse to and perpendicular to the parallel leg axes and to the direction of insertion. Each locking shoulder on each of these legs is primarily on the outside of the leg. These locking shoulders extend in the breadth dimension a small amount also, relative to legs 12, but not inwardly of the leg. Rather, the inner surface 26 at the lower end of leg 12 merges into inner surface 26a of the barb. The outward extension of the shoulder on a one-half inch fastener is preferably about 40 thousandths of an inch while the endwise extension on each side of the leg is preferably about 15 thousandths of an inch.

On the barbs are the inside, triangular, sloping face 26a, an outside, triangular, sloping face 26b, and a pair of opposite end, triangular, sloping faces 26c. The inside face 26a has a greater angle from the vertical, i.e., from the axis of the legs, than the outside opposite face 26b, and is slightly longer and of slightly greater surface area, as a result. Preferably, the inside faces are at an angle of about 25° from the axis of the leg, i.e., from the vertical in the orientation depicted, while the outer faces are at an angle of about 15° from the axis of the legs, i.e., from the vertical. During penetration of the legs into the wood or like material forming the support, legs 12 will be forcefully flexed outwardly a few degrees by the force differential resulting from this angle differential and surface area differential, to drive the locking shoulders laterally into and beneath portions of the penetrated wood W. The outer portions of these locking shoulders initially extend out beyond the legs and, after forced insertion, extend out several thousandths of an inch further. The fastener therefore strongly resists withdrawal. The angle of slope of the end faces is substantially the same to create a balanced force action in this dimension. An angle of about 15° from the vertical is preferred. Moreover, the length of the sloping surfaces on the front and rear is substantially the same, as is the area. Such a shoulder arrangement combined with the differential in slope angles has been found to be highly effective in preventing accidental and/or unintended withdrawal of the fastener once installed.

The fastener is made of a generally rigid, noncorroding material, preferably a zinc alloy, stainless steel, or other noncorroding alloy of metal. They may be formed by injection molding or die casting As noted earlier, the depth of insertion of the fastener into the wood or other material is positively controlled by depth control stop shoulders 18 on legs 12. These are oriented transversely of the long dimension of the leg, transversely to the direction of insertion, generally perpendicular to the leg axis, and facing generally toward the pointed barbs, i.e. to be generally parallel to the drive surfaces 16a. Thus, even though the wood or other material of the support may vary in density and/or softness, the depth control shoulders uniformly determine the insertion depth to avoid damage to the cable and avoid increasing impedance in the cable.

The inside surfaces of the fastener are smooth all the way from the sharp end of the barbs to the concave, generally semicylindrical inner surface 16f of bridge 16, such that there are no sharp edges or blunt surfaces to snag the cable jacket Thus, the inside faces of the barbs blend into the inner surface of lower leg portions 12 which blend into the inner faces of upper leg portions 12a which blend into concave inner surface 16c of bridge 16. The inside, smooth, concave, curvilinear surface 16c, preferably semicylindrical in contour, forms smooth engagement with a cylindrical cable jacket J, and has crisscross, inner and inwardly projecting ribs 20 and 22. Rib 20 extends in the breadth direction of the fastener, i.e., parallel to the cable, and is basically linear, but having a curved, convex, cross-sectional configuration. Rib 22 crosses rib 20, extends in the cross direction, i.e., toward legs 12, and has a curved, arcuate, concave overall configuration from end to end, and a convex, curved, semicircular cross sectional configuration These ribs have a width which is only a fraction of the breadth of bridge 16. These ribs both have about the same depth, preferably about 30 thousandths inch for a half inch staple or fastener, and are integral with the fastener They compress a portion of the cable insulation jacket J enough to prevent the cable C from shifting linearly or twisting, but do not add to cable impedance. The smooth, curved surfaces prevent them from puncturing the cable jacket.

A battery (FIG. 6) of the novel fasteners is formed by interconnecting them in a file, end to end, by any suitable, conventional frangible binder, i.e., adhesive, commonly used to interconnect staples or nails for seriatim separation thereof The end fastener in such a battery can be readily broken free by a driving force transverse to the long dimension of the battery, as by a spring loaded or pneumatically fired driving hammer or plunger D moving in the direction indicated, to strike the drive surfaces of the end fastener, break it free from the battery, and drive it into a support surface S of wood or the like, around a cable C as depicted in FIG. 7. A conventional driver tool is usable as noted previously.

In use, therefore, a battery of the novel fasteners is loaded into the driver tool, and driver hammer D is reciprocated by pneumatic force, spring force or the like to strike the outer end surface area on the anvil or bridge of the end fastener, breaking the end fastener loose from the battery and driving it down around cable C into the support W. In so doing, the pointed barbs of the fastener penetrate the wood with balanced end to end force, but greater outward lateral force, toward the outer locking shoulders 26d, to cause the legs to shift laterally outwardly a few degrees as they penetrate, and thereby force the locking shoulders laterally into and beneath the penetrated wood. The depth of the fastener is controllably limited by stop shoulders 18. Slightly excessive penetrating force may be applied to assure full penetration up to these shoulders. If for some reason the fastener does not penetrate deeply enough, the installer can tap the anvil of the fastener with a hammer to achieve full penetration. Smooth curvilinear surfaces of ribs 20 and 22 depress the cable jacket a small amount to secure the cable against axial and twisting movement, but without distortion of the cable conductor or increase in impedance thereof. Withdrawal of the fastener is prevented by locking shoulders 26d.

Conceivably certain minor features of the preferred embodiment depicted may be altered to suit a particular type of installation. The invention is intended to be limited only by the scope of the appended claims and the reasonably equivalent structures thereto rather than to the depicted preferred embodiment set forth as illustrative of the invention.

The embodiments of the invention in which an exclusive property or privilege is claimed are defined as follows:

1. An integral fastener for securing an insulation-covered, electrically conductive cable to a penetratable support comprising:

a generally U-shaped body including a pair of parallel legs joined on one end thereof by an integral cross member, and having generally parallel axes;

said cross member being arcuate, and having a driving surface area including a pair of generally flat surface portions normal to said axes of said legs, and in axial alignment with said legs;

said cross member having a concave, arcuate, inner surface having a breadth; an inwardly projecting arcuate rib integral with said cross member and extending from and across said cross member arcuate inner surface, said arcuate rib having a width smaller than said breadth of said arcuate inner surface and having a convexly curved cross-sectional configuration to be able to compress the insulation of the cable;

each of said legs having a free end with a barb having inside, outside and end sloped faces jointly terminating in a point, said inside faces being at a greater acute angle to said axes than said outside faces;

said legs having upper portions extending from said cross member, and lower portions extending from said upper portions to said barbs; junctures between said lower portions and said barbs forming locking shoulders transverse to said axes and oriented toward said upper portions; and junctures between said lower portions and said upper portions forming stop shoulders transverse to said axes and oriented toward said barbs; said stop shoulders having rounded inner edges to avoid damage to the insulation during installation.

2. The fastener in claim 1 wherein said stop shoulders are generally normal to the axes of said legs and include outer faces oriented to be able to ride on tracks of a driver tool.

3. The fastener in claim 1 wherein said concave, arcuate, inner surface is generally semicylindrical and has a linear rib transverse to said arcuate rib and extending substantially the breadth of said fastener.

4. The fastener in claim 3 wherein said linear rib has a convex curved surface in cross section.

5. The fastener in claim 1 wherein said inside faces of said barbs are at an angle of about 25° relative to the axes of said legs and said outside faces of said barbs are at an angle of about 15° relative to the axes of said legs.

6. The fastener in claim 5 wherein the angle of said end faces is an angle of about 15° to the axes of said legs.

* * * * *

UNITED STATES PATENT AND TRADEMARK OFFICE
CERTIFICATE OF CORRECTION

PATENT NO. : 5,223,675
DATED : Jun. 29, 1993
INVENTOR(S) : Anthony W. Taft

It is certified that error appears in the above-indentified patent and that said Letters Patent is hereby corrected as shown below:

Column 4, line 11
After "casting" insert -- . --;

Column 4, line 28
After "jacket" insert -- . --;

Column 4, line 38
After "convex" insert --semi-cylindrical--;

Column 4, line 43
After "configuration" insert -- . --;

Column 4, line 47
After "fastener" insert -- . --;

Column 4, line 56
After "thereof" insert -- . --;

Signed and Sealed this

Thirty-first Day of May, 1994

Attest:

BRUCE LEHMAN

Attesting Officer

Commissioner of Patents and Trademarks